United States Patent
Damhuis

(10) Patent No.: US 7,380,978 B2
(45) Date of Patent: Jun. 3, 2008

(54) PROCESS FLUID DISTRIBUTION SYSTEM FOR AGITATING RETORTS

(75) Inventor: Eduard Hendrikus Johannes Damhuis, Bousval (BE)

(73) Assignee: FMC Technologies, Inc., Houston, TX (US)

( * ) Notice: Subject to any disclaimer, the term of this patent is extended or adjusted under 35 U.S.C. 154(b) by 222 days.

(21) Appl. No.: 10/820,898

(22) Filed: Apr. 8, 2004

(65) Prior Publication Data

US 2005/0226094 A1 Oct. 13, 2005

(51) Int. Cl.
*B01F 9/02* (2006.01)

(52) U.S. Cl. ............... 366/175.3; 366/214; 99/371

(58) Field of Classification Search ............ 99/371; 366/175.3, 214, 170.1, 173.2; 285/121.3
See application file for complete search history.

(56) References Cited

U.S. PATENT DOCUMENTS

| | | | | |
|---|---|---|---|---|
| 385,013 | A * | 6/1888 | Roth | ............ 99/371 |
| 629,617 | A * | 7/1899 | Smith | ............ 99/371 |
| 856,384 | A * | 6/1907 | Armbruster | ...... 366/175.3 |
| 872,358 | A * | 12/1907 | Liddell | ........ 185/121.3 |
| 1,327,220 | A * | 1/1920 | Babendeer | ........ 426/618 |
| 1,878,307 | A | 9/1932 | Whyte | |
| 1,948,963 | A * | 2/1934 | Dukes | ............ 34/125 |
| 2,322,693 | A | 6/1943 | Kennedy | |
| 2,449,355 | A * | 9/1948 | Wiley et al. | ...... 285/121.3 |
| 2,531,478 | A | 11/1950 | Smith, Jr. | |
| 2,629,312 | A | 2/1953 | Davis | |
| 2,834,541 | A * | 5/1958 | Szent-Gyorgyi et al. | ...... 494/17 |
| 5,620,250 | A * | 4/1997 | Chilcoat et al. | ...... 366/168.2 |
| 5,676,047 | A * | 10/1997 | Planck et al. | ........ 99/369 |
| 5,687,639 | A * | 11/1997 | Planck et al. | ........ 99/369 |
| 5,705,127 | A * | 1/1998 | Planck et al. | ........ 422/38 |
| 5,857,312 | A | 1/1999 | Walden | |
| 6,009,800 | A * | 1/2000 | Planck, Jr. et al. | ........ 100/35 |
| 2005/0226096 | A1* | 10/2005 | Damhuis | ........ 366/234 |

* cited by examiner

*Primary Examiner*—David L Sorkin
(74) *Attorney, Agent, or Firm*—Christensen O'Connor Johnson Kindness pllc

(57) ABSTRACT

An agitating retort (100) includes an outer shell (102) within which the drum structure (112) is disposed for rotation within the shell while supporting a number of baskets (114) for holding products to be processed within the retort. Processing fluid is applied to the interior of the shell (102) through a rotary coupling (115) disposed within the shell. The coupling routes processing fluid to a distribution system (116) to outlet holes or nozzles (118) positioned within the drum structure (112).

34 Claims, 8 Drawing Sheets

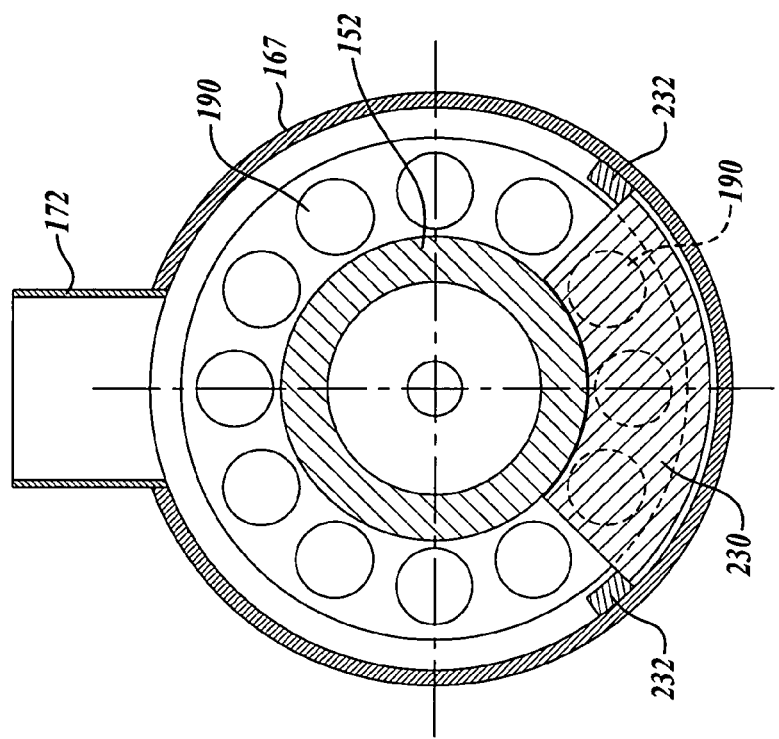
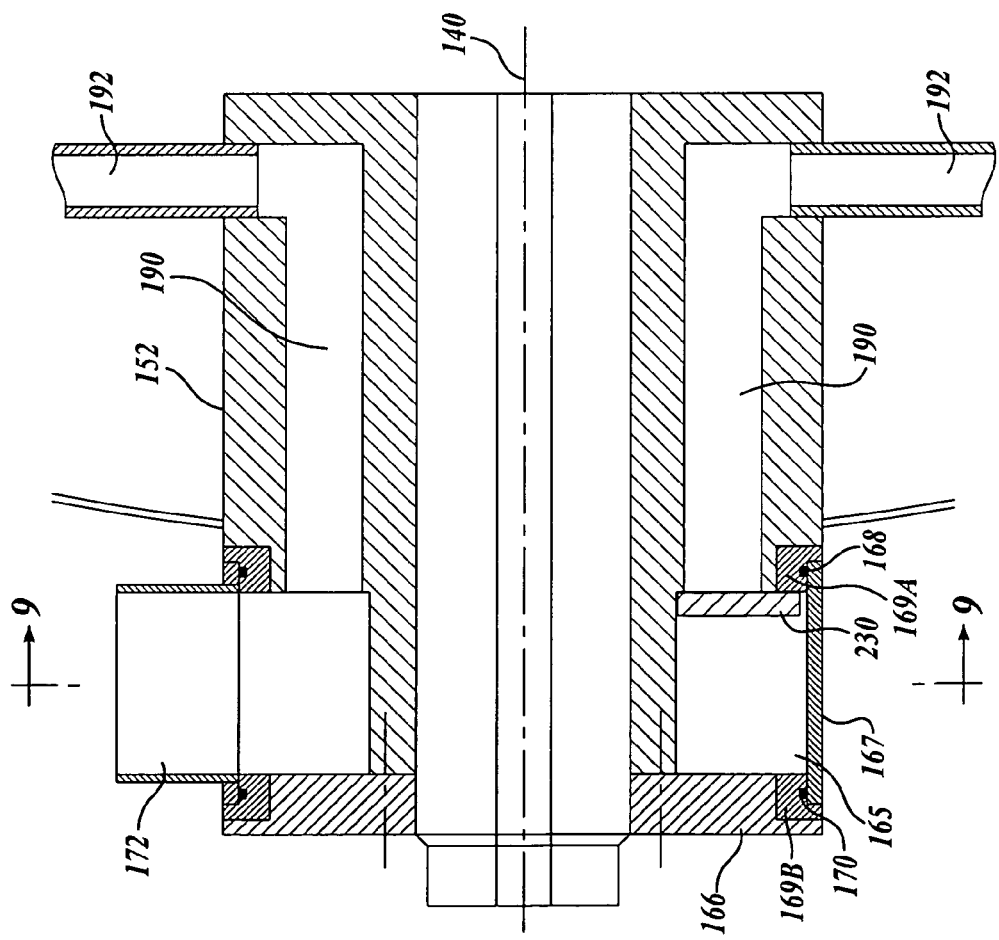
Fig. 9.
Fig. 8.

PROCESS FLUID DISTRIBUTION SYSTEM FOR AGITATING RETORTS

FIELD OF THE INVENTION

The present invention relates to retort systems for in-container preservation of foodstuffs, and more particularly to a system for supplying processing fluid to the interior of the retort drum.

BACKGROUND OF THE INVENTION

Agitating retorts are widely used for in-container preservation of foodstuffs, either for pasteurization or sterilization processes. FIGS. 1-3 illustrate constructions of known agitating retorts. Referring initially to FIGS. 1 and 2, the illustrated agitating retort 18 consists of an outer retort shell 20, which in essence is a generally cylindrically shaped pressure vessel that houses a drum 22 for rotation within the shell. The drum is adapted to receive baskets 24 within which are stacked containers of foodstuffs or other products to be processed. The containers may be in the form of cans, glass jars, or of other types. Alternatively, the foodstuff containers may be arranged on trays carried by pallets, not shown. The baskets of foodstuff containers are held in place within the drum to restrain the baskets and containers during the retorting process.

The drum 22 may be of various constructions, including that shown in FIGS. 1 and 2, wherein the drum is shown as being of an open design. Drum 22 is constructed from a number of spaced-apart vertical discs 30 that are joined together by a series of longitudinal tube structures 32 spaced about the perimeter portion of the discs to provide structural strength of the drum. Reinforcing braces 34 may be welded or otherwise affixed between the tubes in a crisscross pattern for further structural strength and/or rigidity. A door 36 is used to close the open end of the shell 20 into which baskets holding the containers are loaded and unloaded from the drum 22.

In some retort processes the drum 22 is rotated about its longitudinal axis. Rollers 38 located in the lower portion of retort shell 22 support the drum for such rotation of movement. A powered shaft 40 may be coupled to the end of the drum opposite door 36 for rotation of the drum. As shown in FIG. 2, generally square- or rectangular-shaped openings 42 are formed in the discs for receiving the baskets 24. Various types of clamping systems, not shown, may be used to hold the containers and baskets in place when the drum is rotated The retorting process may be of various types, including water spray, combined water and steam spray, and water immersion. In the water spray and combined water and steam spray process, the processing fluid is typically supplied to an inlet 48 at the top portion of the retort, and then through lines or pipes 50 running the full length of a retort shell in the space between the inside diameter of the shell and the outside diameter of the drum. Injection holes or nozzles 52 are disposed along the length of the pipes 50 for directing the processing fluid toward the containers disposed within the rotating drum. As will be appreciated, a certain portion of the processing fluid from the nozzles 52 strikes the tube structures 32 and reinforcing braces 34, and thus, may never reach the interior of the drum. Moreover, when the fluid droplets from the overhead pipes 50 actually reach the interior of the drum and contact either the drum interior, the basket or containers, such droplets are during rotation of the drum subjected to a centrifugal force that counteracts the downward gravitational forces acting on the droplets, thereby reducing the capacity of the droplets to reach the center portion of the baskets. With increasing rotational speed of the drum this results in increasingly less uniform distribution of the processing water inside the baskets. Eventually the processing fluid collects at the bottom of the retort shell and is routed out of the shell through an outlet 54 to a recirculation pump that re-injects the processing fluid through openings in the top and sides of the retort to the lines or pipes 50.

FIG. 3 illustrates another embodiment of an existing retort which is constructed similarly to the retort shown in FIGS. 1 and 2, and thus like parts are given the same numbers, but with prime (') designation. The retort 18' shown in FIG. 3 is designed for use with a water immersion process. The level of processing fluid in the retort may vary, or the retort may be completely filled with the processing fluid. The processing fluid may be introduced into the retort shell by multiple inlets 48' shown at the top of the shell 20' over the length of the retort. Typically, one inlet 48' is present per basket. As a consequence, the processing fluid does not flow evenly through the baskets 24, especially when the drum is held stationary. This leads to uneven heating and cooling of the containers disposed within the baskets, and thus, a variation in the sterilization value of the products in the containers. As a consequence, often it is necessary to rotate the retort drum 22' to provide adequate mixing and distribution of the processing fluid within the retort 18'. The present invention seeks to address the limitations and drawbacks of existing retorts, including agitating retorts.

SUMMARY OF THE INVENTION

In accordance with the teachings of the present invention, a retort is described as composed of a shell structure and a drum assembly rotatable within the shell structure, wherein a drum assembly is adapted to receive containers of products to be processed within the retort. The contents of the containers are processed within the retort by water, steam, or a combination of both, which is introduced in the retort through distribution lines positioned within the drum. Outlet holes or nozzles are spaced along the distribution lines to direct the processing fluid at the containers. A rotary coupling receives the processing fluid from a location external from the retort and directs such processing fluid to the distribution lines located within the interior of the drum, including during rotation of the drum within the shell.

The drum includes a hub assembly having portions defining a fluid receiving annulus in fluid flow communication with the source of processing fluid, and also in fluid flow communication with the fluid distribution system. The hub assembly also includes a distribution manifold interposed between the fluid receiving annulus and the fluid distribution lines. In a further aspect of the present invention, the distribution includes a plurality of processing fluid passageways extending from the fluid receiving annulus to the distribution lines.

In another aspect of the present invention, the drum hub assembly is rotatable by a torque source that applies torque to the hub assembly thereby to rotate the drum assembly within the shell. Portions of the hub assembly rotate with the drum whereas other portions remain stationary relative to the retort shell.

In accordance with a further aspect of the present invention, flow controllers restrict or block the flow of processing fluid to selected portions of the distribution system. In an additional aspect of the present invention, the flow controllers are disposed between the fluid receiving annulus and the distribution system to block the flow of processing fluid to selected distribution lines. In accordance with a further aspect of the present invention, the blocking of the processing fluid to specific portions of the distribution system depends on the rotational direction of the drum.

In accordance with further aspects of the present invention, the fluid receiving annulus comprises a groove formed in the hub assembly, with the groove open in the radial direction relative to the hub assembly. A rotary collar is closely engaged over the groove and a seal is disposed between the collar and groove to permit relative rotation between the collar and the groove while sealing passage of processing fluid between the collar and the groove.

In a further aspect of the present invention, a reaction mechanism is provided for preventing rotation of the collar with the hub assembly. The reaction mechanism may be coupled to the shell structure by a coupling system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a view similar to FIG. 6 of another embodiment of the present invention;

FIG. 9 is a cross-sectional view of FIG. 8, taken substantially along lines 9-9 thereof;

DETAILED DESCRIPTION OF THE PREFERRED EMBODIMENT

Figure 4:
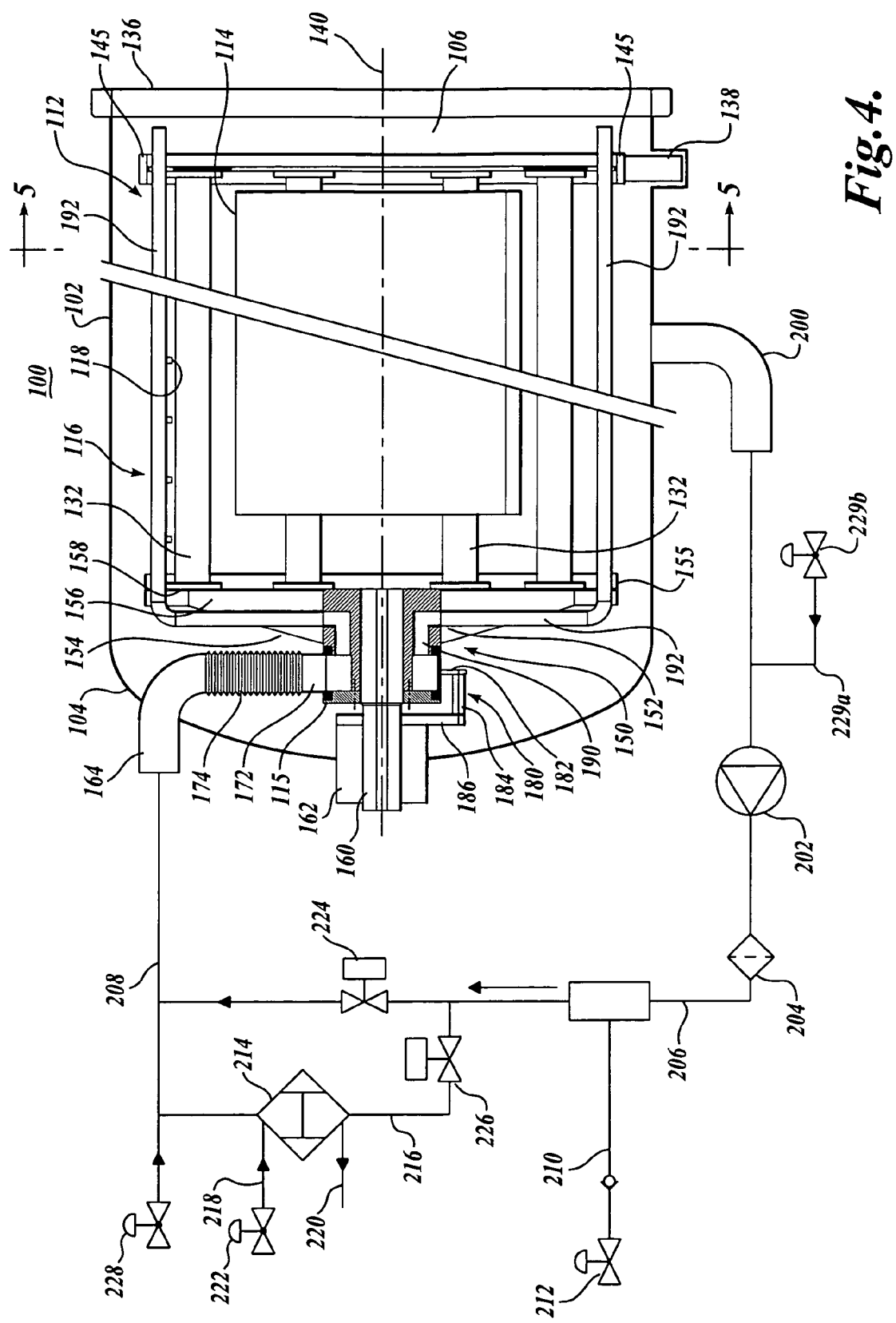
FIG. 4 is a schematic side elevational view of a retort system constructed in accordance with the present invention.
Figure 5:
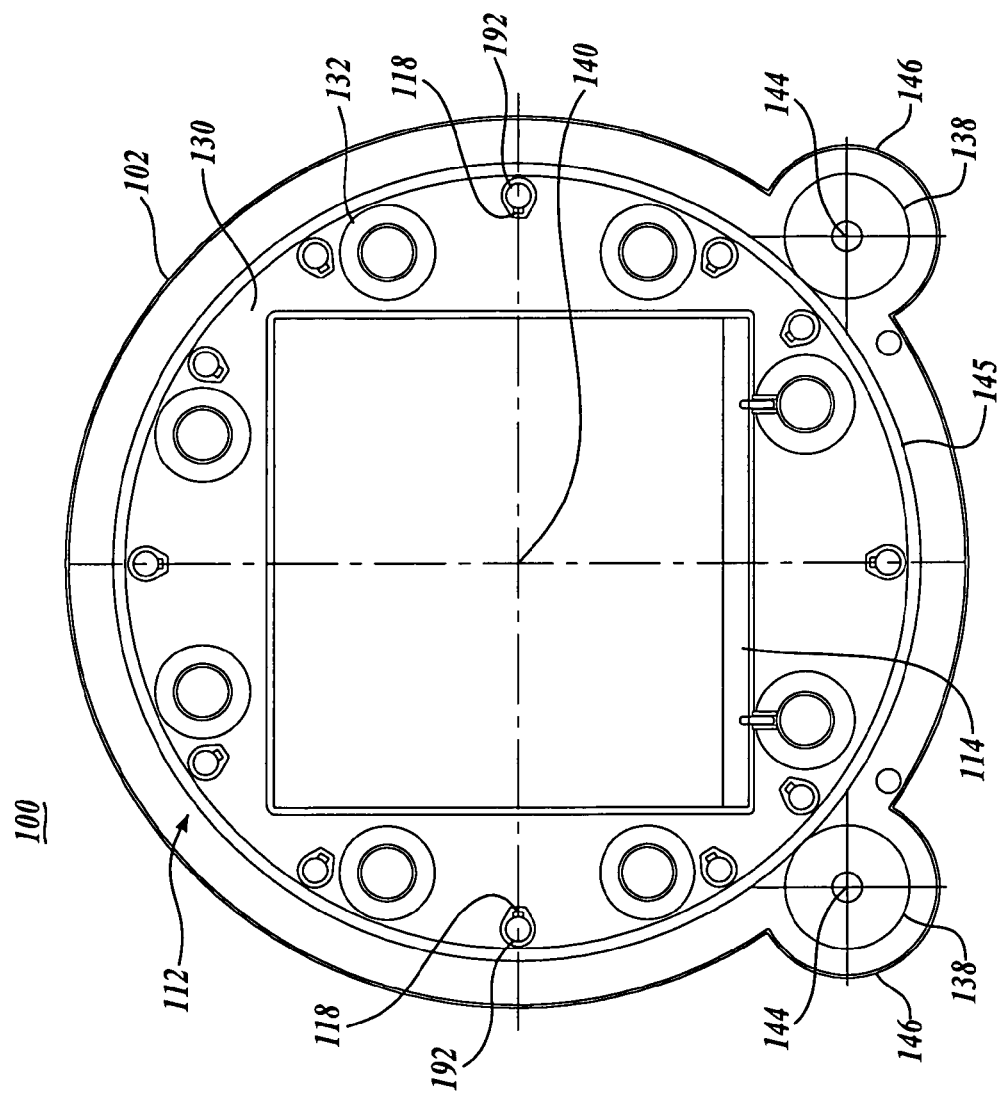
FIG. 5 is a schematic cross-sectional view of FIG. 4, taken substantially along lines 5-5 thereof.

Referring initially to FIGS. 4 and 5, the agitating retort 100 of the present invention includes an outer shell 102 in the form of a generally cylindrically shaped pressure vessel having a closed end 104 formed in a convex shape typical of pressure vessels. The opposite end 106 of the retort is closable with door 136 which forms a steam- and/or water-tight seal with the adjacent end of the shell 102. A drum structure 112 is disposed within the shell to occupy substantially the entire volume of the shell. The drum structure is adapted to rotate within the shell while supporting a number of baskets 114 or other types of structures utilized to receive containers stacked in the baskets. Such containers hold foodstuffs or other products to be processed within the agitating retort. Processing fluid is supplied to the interior of the shell 102 and then flows through a rotary coupling 115 for routing through a distribution system 116 to fluid outlet holes or nozzles 118 positioned within the drum structure. In this manner, the processing fluid may be applied directly to the containers carried in the baskets 114, rather than having to penetrate the exterior structure of the drum, as would be the case if the holes or nozzles 118 were positioned about the shell 102 outside of the drum structure in a typical manner.

Figure 1:
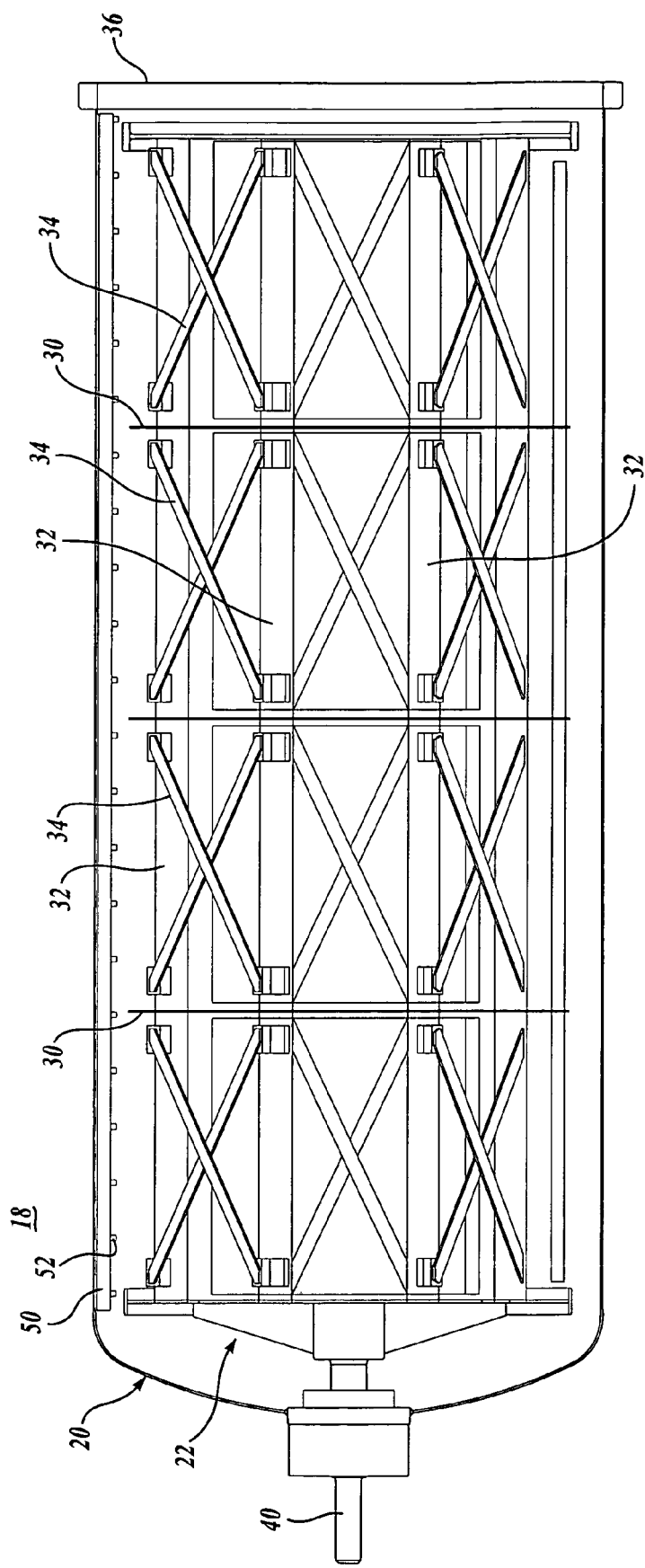
FIG. 1 is a schematic side elevational view of a prior art agitating retort structure.
Figure 3:
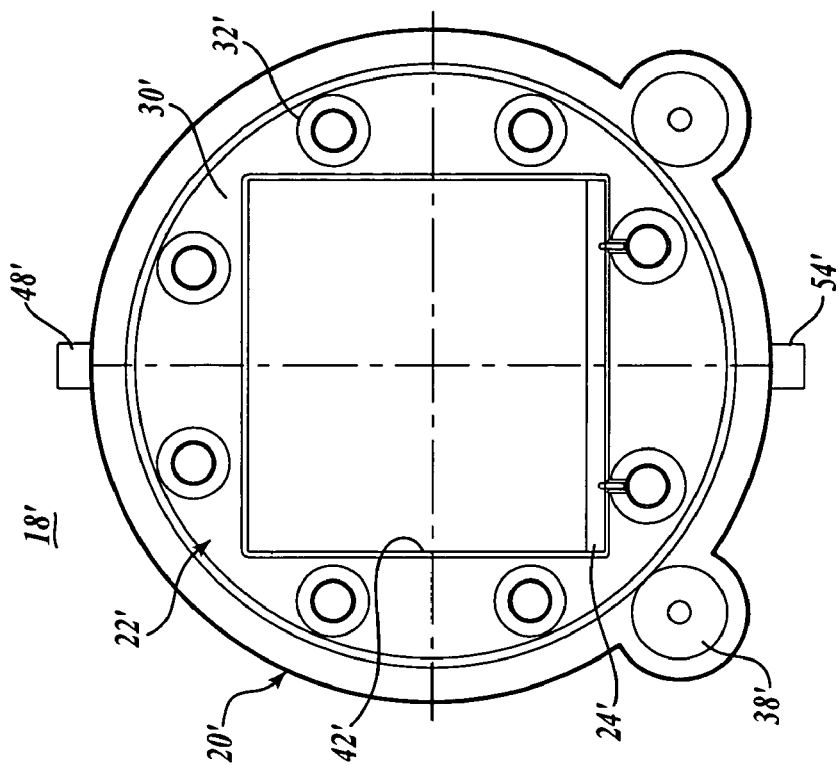
FIG. 3 is a further schematic cross-sectional view of an existing retort similar to FIG. 2.
Figure 2:
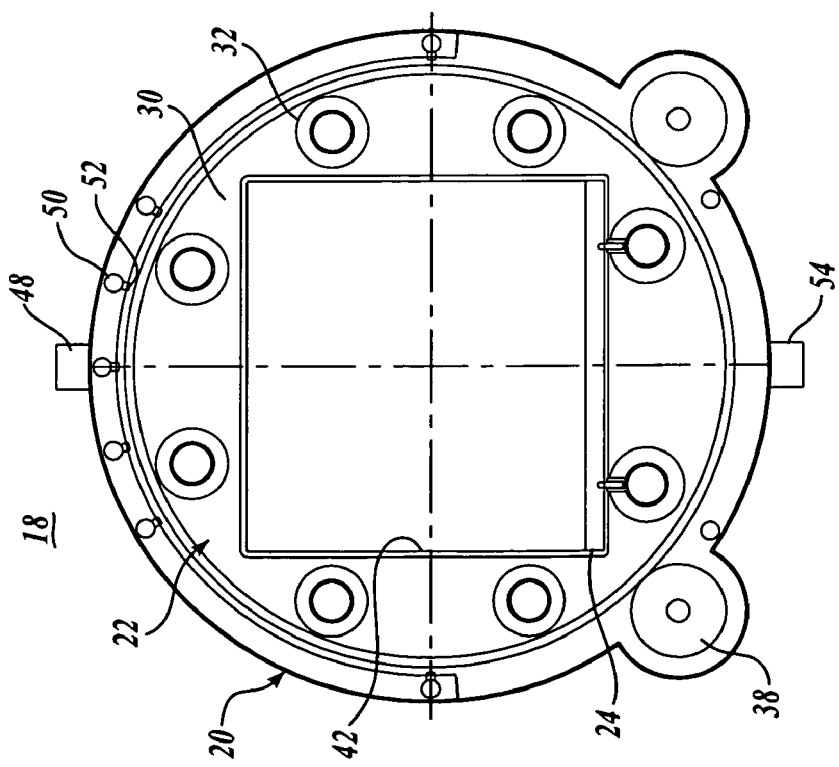
FIG. 2 is a schematic cross-sectional view of FIG. 1, taken substantially on lines 2-2 thereof.

Describing the present invention in more detail, the drum 112 is illustrated in FIGS. 4 and 5 as a construction similar to drum 22 shown in FIGS. 1 and 2. Thus the components of drum 112 are identified by corresponding part number as the related components in FIGS. 1 and 2, but with a one hundred (100) series part number. For example, the discs 30 of FIGS. 1 and 2 are identified by item number 130 in FIGS. 4 and 5. Although a particular drum structure 112 is illustrated, it is to be understood that numerous other drum structure configurations may be utilized in conjunction with the present invention.

The drum 112 is supported for rotation about the longitudinal axis 140 of the drum by pairs of support rollers 138 which rotate about axes 144 parallel to axis 140. The rollers 138 bear against a reinforcing ring 145 that encircles the adjacent open end of the drum 112. The rollers 138 may be positioned within housings 146 that project radially outwardly from shell 102, or, alternatively, the rollers may extend outwardly from the shell and be sealed relative to the shell so as to not allow processing fluid to leak out of the shell. Although rollers 138 are only shown adjacent the end portion of the drum 112 corresponding to the opened end 106 of the shell, it will be appreciated that rollers similar to rollers 138 may be positioned at other locations along the length of the drum, including at locations intermediate the ends of the drum structure.

The drum 112 includes a hub assembly 150 positioned within the shell 102 adjacent the closed end 104 of the shell. The hub assembly 150 includes a hub structure 152 positioned in alignment with axis 140 by a plurality of spokes 154 extending radially outwardly from hub structure 152 to the interior diameter of a ring 155 at the adjacent end of the drum 112. As shown in FIG. 4, the spokes 154 each include a longitudinal section 156, wherein the surface thereof defines a plane extending lengthwise of the drum 112 and a corresponding transverse section 158, wherein the surface thereof defines a plane extending transversely to the length of the drum 112. The spoke components 156 and 158 cooperatively form high-strength structures while allowing the adjacent end portion of the drum 112 to be substantially open.

The hub assembly 150 is used for rotating the drum 112 and also for routing processing fluid to the distribution system 116 and corresponding outlet holes or nozzles 118. With respect to rotating the drum 112, a drive shaft 160 extends through a bearing assembly 162 carried by shell 102 to rotationally support drive shaft 160. The bearing assembly may also include one or more seals (not shown) to prevent processing fluid from leaking past the drive shaft 160. The outward end portion of the drive shaft 160 may be powered by an electric motor or other power source for applying rotational torque to the drive shaft. If an electric motor is used as the power source for the drive shaft, then the gear, belt, or other type of transmission system may be employed to reduce the motor speed to the range desired for the rotation of the drum structure. In addition to rotating the drum 112, it will be appreciated that the drive shaft 160 also supports the adjacent end portion of the drum about rotational axis 140.

As noted above, the hub assembly 150 is also used to route processing fluid from an inlet line 164 to the distribution system 116. In this regard, the hub structure 152 of assembly 150 is constructed with a relatively large radial channel or groove 165 at the longitudinally outwardly end of the hub structure. The groove 165 is defined by the hub structure 152 and by an end plate 166 attached to the adjacent end portion of the hub structure, see also FIGS. 6 and 8. Alternatively, the end plate 164 may be integrated into the hub structure 152 itself. The otherwise radially open groove 165 is closed off or covered by a cover collar 167, which overlaps the groove 165. Between the cover collar 167 and the hub structure 152 is a ring 169A with a seal 168 against the underside of the collar 167. Between the cover collar 167 and the end plate 166 is a ring 169B with a seal 170 against the underside of the collar 167. The pressure of the processing fluid inside the groove 165 will press the ring 169A against the hub structure 152 and the ring 169B against the end plate 166 thereby forming a mechanical seal. A processing fluid inlet nipple 172 extends radially outwardly from collar 167 for directing processing fluid into groove 165. It will be appreciated that collar 167 and groove 165 cooperatively define a processing fluid receiving annulus. Nipple 172 is connected to processing fluid inlet line 164 through the use of a bellows-type inter-connector 174. Such inter-connector can accommodate misalignment between the inlet line 164 and the nipple 172 as well as relative movement therebetween caused by thermal expansion or contraction. Although only one nipple 172 is illustrated, additional nipples may be utilized so that adequate flow of the processing fluid reaches the fluid receiving annulus.

As will be appreciated, the collar 167 remains stationary relative to retort shell 102 whereas the hub structure 152 rotates with the drum 112. The collar 167 is prevented from rotating with the hub structure 152 by a reaction assembly 180, as shown most clearly in FIG. 4. The reaction assembly includes a first reaction arm 182 extending radially from collar 167 and coupled to the adjacent end portion of longitudinal bar 184, with the other end of the bar attached to a stationary second arm 186 extending radially from a stationary location of the shell 102. Of course, other systems or structures can be utilized to restrain the collar 167 from rotating.

Figure 7:
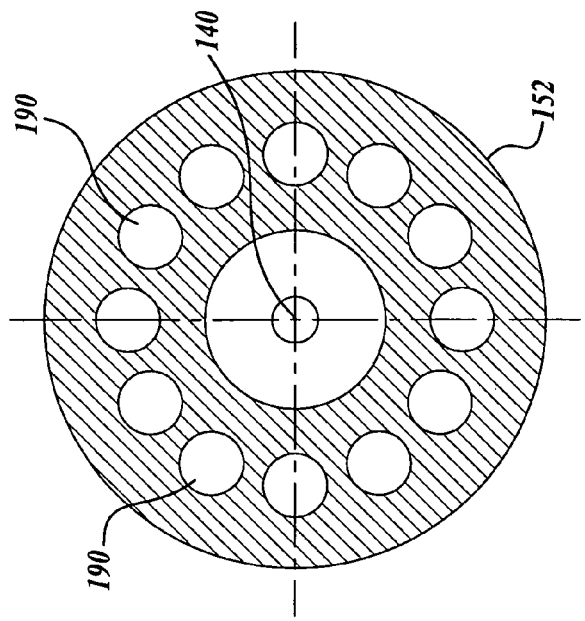
FIG. 7 is a cross-sectional view of FIG. 6, taken substantially along lines 7-7 thereof.
Figure 6:
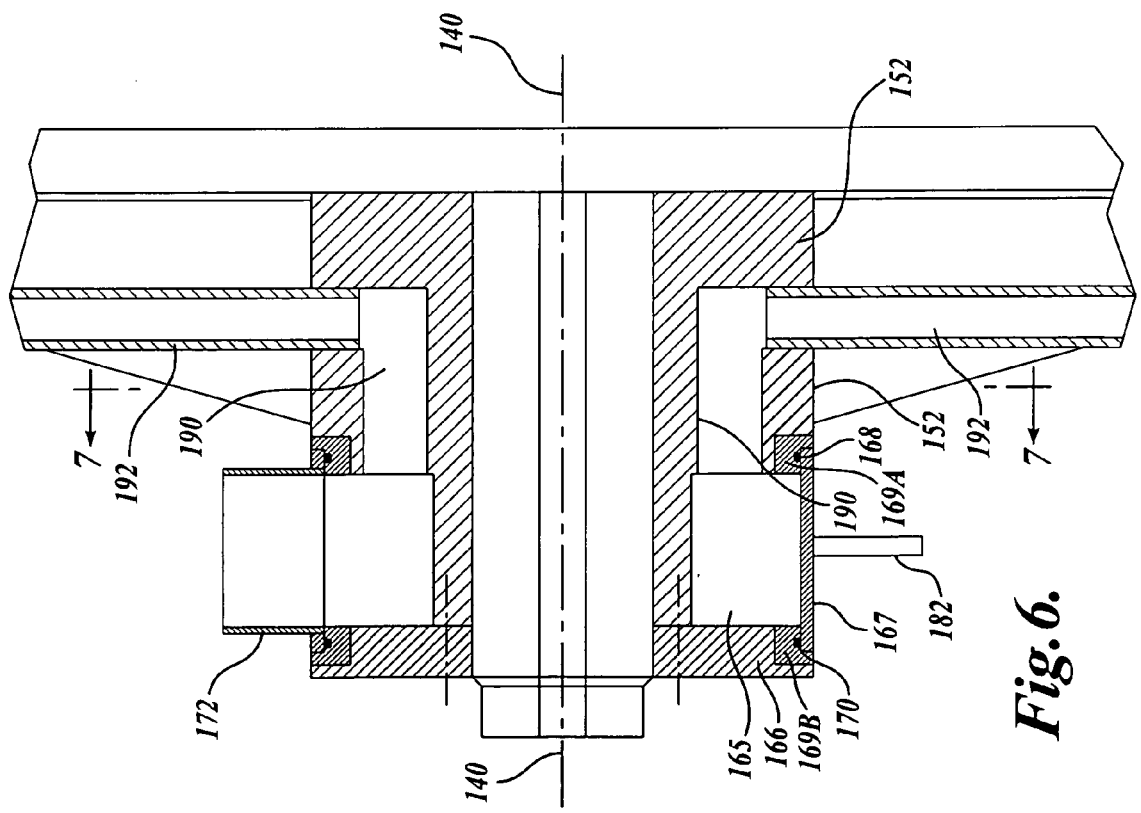
FIG. 6 is an enlarged, partial, cross-sectional view of the hub assembly of a drum constructed in accordance with the present invention.

The processing fluid distribution system 116 further includes a plurality of passageways 190 extending longitudinally relative to axis 140 from channel or groove 165 and then radially outwardly to the exterior of hub structure 152 to couple with corresponding distribution lines 192. FIGS. 6 and 7 show twelve passageways 190. However, a larger number or fewer number of passageways may be utilized in conjunction with the present invention. It will be further appreciated that the groove 165 and passageways 190 serve as a flow manifold for the processing fluid, thereby directing the processing fluid from the inlet line 164 to the distribution lines 192.

The lines 192 initially extend radially outwardly from the hub assembly 150 to the inside of the drum 112 and then extend longitudinally along the length of the drum. The lines 192 are shown in FIG. 5 as generally evenly spaced about the circumference of the drum 112. However, if desired the lines can be placed in clusters or other arrangements rather than being evenly spaced about the drum. The distribution lines 192 may be fixed to the drum in any convenient manner. Also, the distribution lines pass through clearance openings formed in plates 130. The longitudinal portions of the lines 192 may be attached to plates 130. Outlet holes or nozzles 118 are positioned along the length of the lines 192 to direct processing fluid toward the interior of the drum 112. As can be appreciated, various types of holes or nozzles may be utilized in conjunction with the present invention. In addition, the size or outlet areas of the nozzles may increase along the length of the lines 192 from the closed end 104 of a shell toward the open end of the shell to reflect the pressure drop in the processing fluid along the length of the lines. It will be further appreciated by the foregoing construction that the holes or nozzles 118 are able to spray or supply processing fluid directly to the interior of the drum 112 rather than having to pass through the exterior structure of the drum, which would be required if the holes or nozzles 118 were located outside of the drum in a typical manner. As a consequence, from the present invention, it is possible to uniformly distribute the processing fluid to the containers disposed within the drum during operation of the retort.

The processing fluid directed at the interior of the drum 112 by holes or nozzles 118 collects at the bottom of the retort shell 102. Such used processing fluid passes out of the shell 102 through an outlet 200 to a circulating pump 202 which pumps the used processing fluid through a filter 204 disposed in flow line 206 and back to an inlet line 208 connected to retort shell inlet 166. Steam from a supply line 210 may be added to the processing fluid being recirculated. A valve 212 may be located in line 210 and operated as required to add the desired amount of steam to the recirculated processing fluid. The steam valve 212 may be automatically operated using well-known control devices that control systems. The processing fluid may be further heated or cooled in a heat exchanger 214 disposed within a line 216 that runs parallel to line 206. A heating or cooling medium is circulated through the heat exchanger 214 through inlet and outlet lines 218 and 220, with a valve 222 controlling the amount of heating/cooling medium flowing through the heat exchanger. Valves 224 and 226 are interposed in lines 206 and 216 to direct the recirculating processing fluid either through line 206 or 216 as desired. Heating or cooling water may also be supplied directly to inlet line 208 via valve 228 or to the inlet of the pump 202 via line 229A and valve 229B. It will be appreciated that other arrangements for the recirculation and regeneration of the processing fluid may be utilized.

As a further aspect of the present invention, as shown in FIGS. 8 and 9, processing fluid may be supplied to selective distribution lines 192 thereby increasing the effectiveness of the retort system of the present invention, for example, when the lines 192 are at the lower part of the rotation of the drum 112 the flow of water from such lines does not effectively reach the containers disposed within the drum. Thus, the flow of processing fluid to these distribution lines could be restricted or cut off, thereby actually improving the efficiency of the agitating retort 100. Flow to these lower distribution lines can be restricted or blocked by a flow control plate 230 positioned in the lower portion of groove or channel 165 at the intersection of the channel with the lowermost passageways 190. As shown in FIGS. 8 and 9, plate 230 is generally in the shape of a segment of the annulus defined by groove 165 and collar cover 167. The plate 230 is sized to restrict or block off the lowest three passageways 190. It is to be understood that the plate 230 may be increased or decreased in size to control the flow to a larger number or a fewer number of passageways 190. The flow control plate can be held in place by lugs 232 extending radially inwardly from the inside surface of collar 167, or by any other convenient means. As will be appreciated, the hub structure 152 rotates relative to the plate 230.

Figure 11:
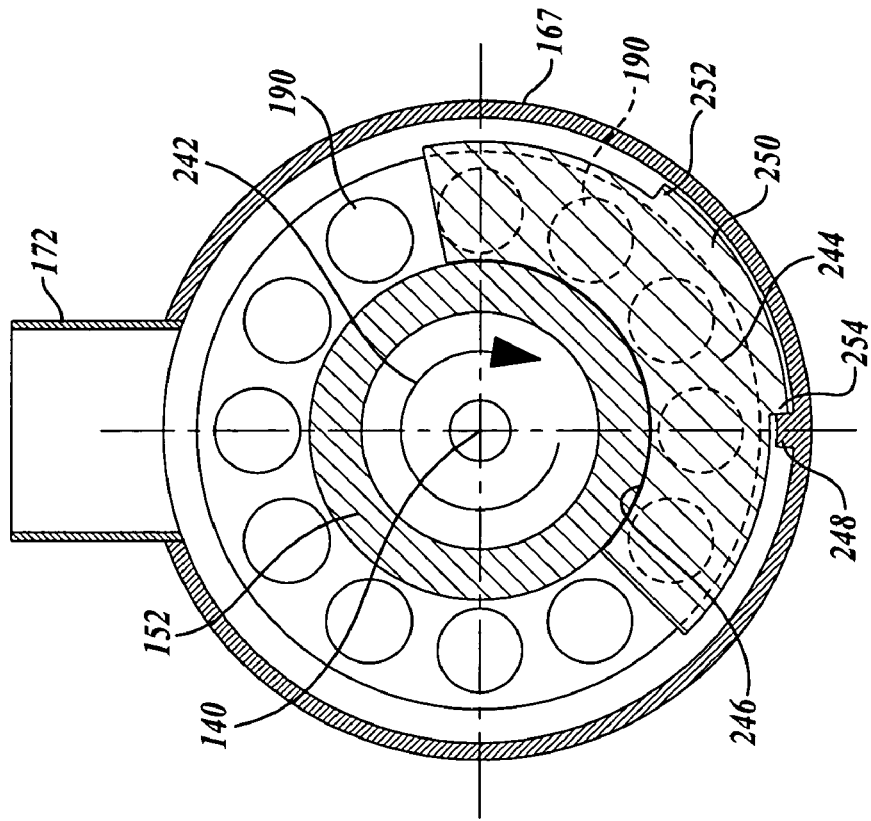
FIGS. 10 and 11 are cross-sectional views of a further embodiment of the present invention similar to FIG. 9.
Figure 10:
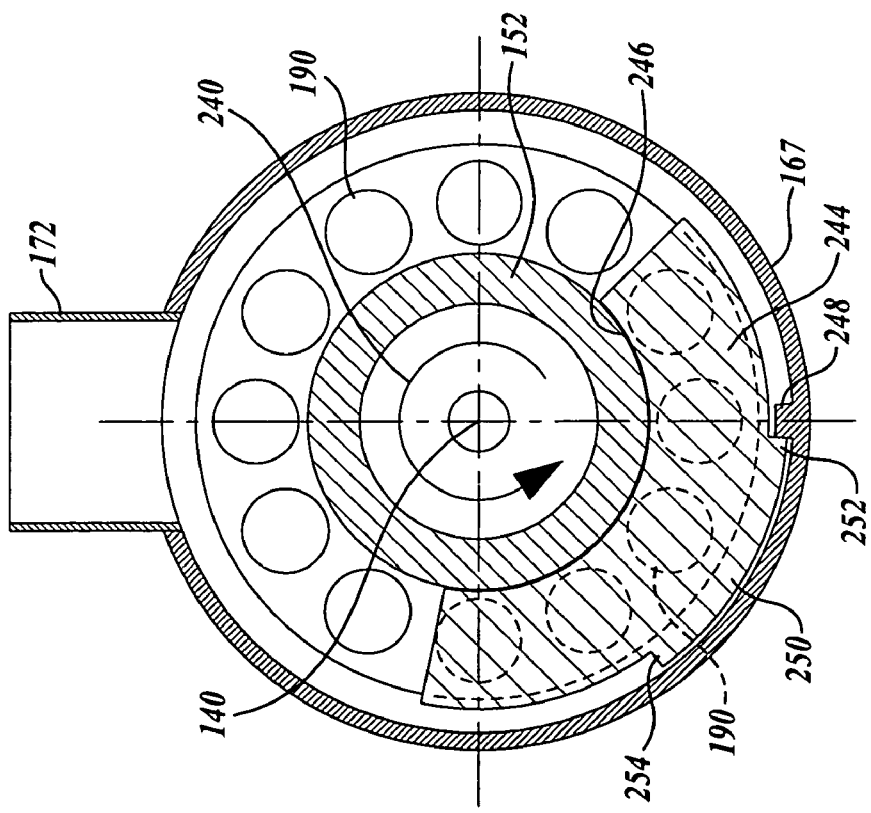

As a further aspect of the present invention, the effectiveness or efficiency of the present invention may also be enhanced if processing fluid distribution lines 192 on the downwardly moving side of the drum 112 were fully or partially blocked off, since the processing fluid from these lines will almost immediately run off the containers and baskets within the drum. As shown in FIG. 10, when the drum is rotating in the counterclockwise direction of arrow 240, the flow of processing fluid to the passageways 190 on the left-hand side of the hub structure 152 may be restricted or blocked. Correspondingly, when the drum is rotated in the clockwise direction of arrow 242, the passageways 190 on the opposite (right) side of FIG. 11 may be blocked or at least partially restricted. Such passageways may be restricted or blocked by a flow control plate 244 that is disposed within channel or groove 165 in the manner of flow control plate 230 shown in FIGS. 8 and 9. As in plate 230, the plate 244 is shaped as a portion or segment of the annulus defined by groove or channel 165 and collar 167. The plate 244 is sized and shaped so that its inside edge portion 246 is disposed adjacent the rotating hub structure 152. As a result, the friction between the plate 244 and the hub structure causes the plate to rotate in the direction of rotation of the drum until the plate 244 encounters an abutment lug 248 projecting inwardly from the lower portion of collar 167. The plate 244 includes a radially outwardly rim portion 250 that rides closely adjacent to inside surface of collar 167. As shown in FIG. 10, when the drum rotates in the direction of arrow 240, one end 252 of the rim portion 250 abuts against lug or stop 248 to block off the depicted passageways 190, whereas when the drum rotates in the clockwise direction of arrow 248 the stop plate 244 rotates within the annulus of the hub structure until the opposite end portion 254 of the rim 250 abuts against stop 248. It is to be understood that the passageways 190 may be restricted or blocked off by means other than flow control plate 244.

Although the present invention has been illustrated in conjunction with a rotary coupling 115 integrated within the hub assembly 150 of drum 112, the rotary coupling can be constructed independently of the hub assembly. In this regard, the rotary coupling may be positioned inside of the retort shell 102 or may be positioned outside of the retort shell. However, if positioned within the retort shell 102, any processing fluid leakage at the rotary coupling will simply drain to the bottom of the shell 102 and be recirculated in the manner described above. Thus, it is not necessary to use expensive seals to seal the rotary coupling from leakage of the processing fluid. A leakage as high as 2%-5% of the processing fluid at the rotary coupling would be acceptable.

Also by locating the rotary coupling inside the shell 102, the pressure differential over the bellows 174 is constant and equal to the pressure head that is necessary to achieve the flow through the nozzles. The pressure inside the retort shell 102 varies and may be up to the rated pressure of the retort (typically 5 bar or 73 psi), but this has no impact with the coupling inside the retort shell.

Figure 12:
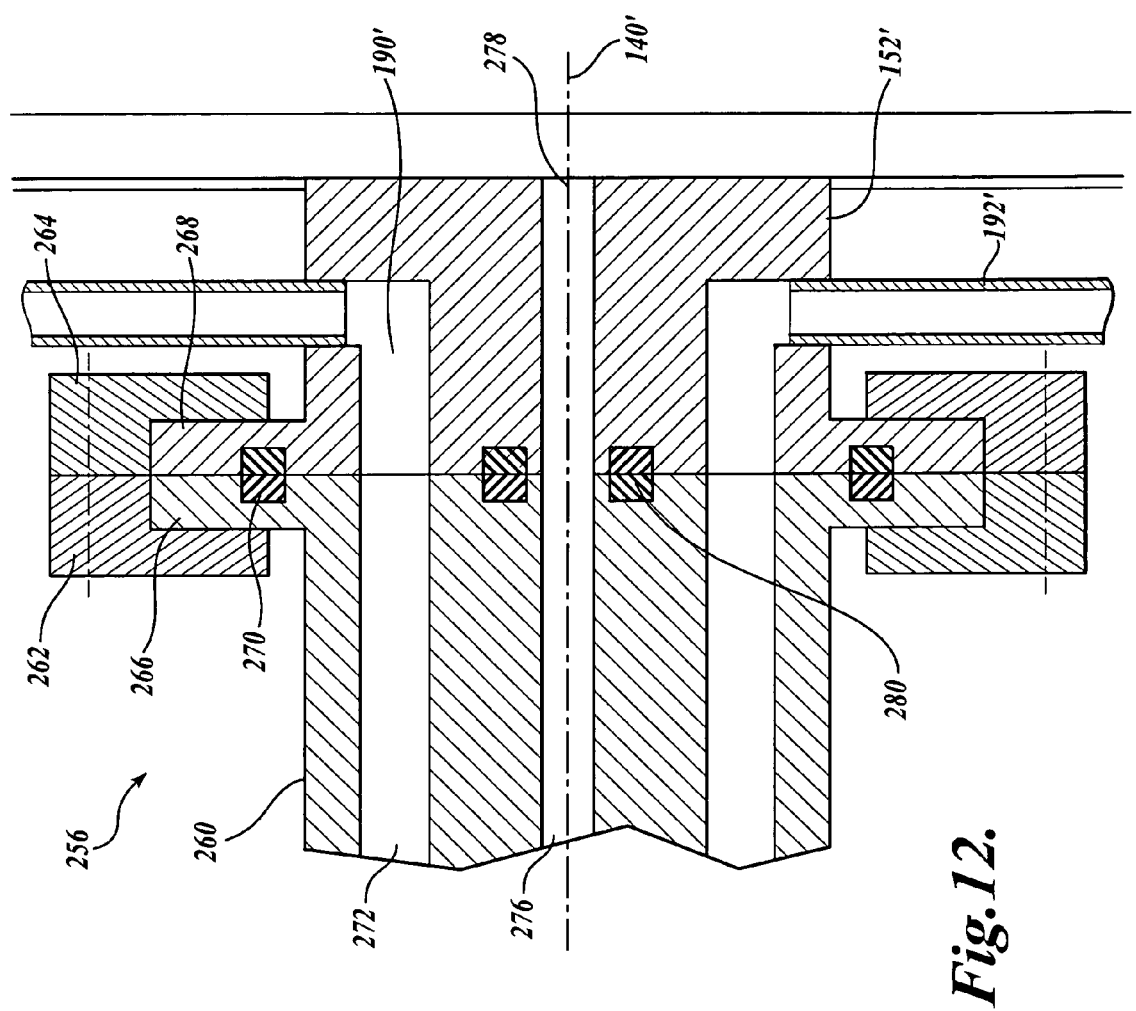
FIG. 12 is a fragmentary cross-sectional view of a further embodiment of the present invention corresponding to FIG. 6.

In addition, rather than being rotated by drive shaft 160, the drum 112 can be rotated by other means. For example, one or more of the support rollers 142 may be powered to rotate the drum. Also, other alternatives may be used to rotate the drum. If the drum is not rotated by drive shaft 160, but rotated otherwise, the radial rotary coupling described above may be substituted with an axial rotary coupling. An example of such a coupling 256 is shown in FIG. 12, wherein reference numbers of components corresponding to similar components described above are given the same reference number but with the prime (') designation. As shown in FIG. 12, the coupling 256 includes a stationary supply hub 260 coupled to hub structure 152' by a collar assembly having two halves 262 and 264 that retain together the stationary flanges 266 extending radially outwardly from the hub 260 and a rotating flange 268 extending radially outwardly from hub 152'. Hydrostatic seals or other types of seals 270 may be interposed between flanges 266 and 268 to limit leakage between the flanges.

Annular hub 260 includes an annulus 272 which is in registry with passageways, 190' formed in the hub structure 152'. In this manner, processing fluid from annulus 272 is directed to the passageways 190' and then to distribution lines 192'. Particular passageways 190' can be blocked or restricted by flow plates or similar devices positioned within the annulus 272 at a location adjacent the facing end portion of hub structure 152'.

A central passageway 276 may be formed in annular hub 260 through which air and or other fluid lines may be supplied to the interior of retort 100. In this regard, a similar central passageway 278 may be provided in the rotatable hub structure 152'. Appropriate seals 280 may be interposed between the adjacent end portions of the annular hub 260 and the hub structure 152' to help prevent the leakage of processing fluid from the annulus 272 to the passageways 276 and 278.

It will be appreciated that the present invention provides novel process fluid distribution systems for agitating retorts that are capable of high flow rates that are required. Such flow rates may be in excess of 400 cubic meters per hour (approximately 1800 gallons per minute).

While the preferred embodiment of the invention has been illustrated and described, it will be appreciated that various changes can be made therein without departing from the spirit and scope of the invention.

The embodiment of the invention in which an exclusive property or privilege is claimed are defined as follows:

1. An agitating retort, comprising:
   (a) a substantially closed shell structure;
   (b) a drum assembly rotatable within the shell structure, said drum assembly being centrally substantially hollow to receive containers of food products therein for processing the food products within the containers within the agitating retort;
   (c) a process fluid distribution system positioned within the interior of the drum assembly to distribute processing fluid within the drum assembly, said processing fluid distribution system configured and positioned to cause process fluid to flow over the food product containers; and
   (d) a rotary coupling disposed within the shell structure and exterior to the interior of the drum assembly, the rotary coupling further in fluid flow communication with the distribution system to direct processing fluid from the exterior of the drum assembly to the distribution system within the drum assembly during rotation of the drum assembly within the shell.

2. An agitating retort according to claim 1, wherein the drum assembly includes a hub sub-assembly coupled to one end portion of the drum assembly, said rotary coupling integrated into the hub sub-assembly.

3. The agitating retort according to claim 2, wherein the hub sub-assembly is rotatable by a torque source supplied to the hub sub-assembly, thereby to rotate the drum assembly within the shell structure.

4. An agitating retort according to claim 2, wherein said rotary coupling comprising portions defining a fluid receiving annulus in fluid flow communication with a source of processing fluid and in fluid flow communication with a processing fluid distribution system.

5. An agitating retort according to claim 4, wherein the fluid-receiving annulus is built into the hub sub-assembly.

6. An agitating retort according to claim 4, wherein said hub sub-assembly further comprising a distribution manifold in fluid flow communication with the fluid receiving annulus and in fluid flow communication with the process fluid distribution system.

7. An agitating retort according to claim 6, wherein said distribution manifold is integrated into the hub sub-assembly.

8. An agitating retort according to claim 7, wherein said distribution manifold comprising a plurality of processing fluid passageways extending from the fluid receiving annulus to the distribution system.

9. An agitating retort according to claim 8, wherein such passageways have outlets leading to the distribution lines that extend transversely from the hub sub-assembly.

10. An agitating retort according to claim 6, further comprises a flow controller operable within said distribution manifold to block or restrict flow of processing fluid to portions of the distribution system.

11. An agitating retort according to claim 10, wherein portions of the distribution system restricted or blocked by the flow controller depend on the rotational direction of the drum.

12. An agitating retort according to claim 4, further comprising a flow controller disposed between the fluid receiving annulus and the distribution system to selectively restrict or block flow of processing fluid to portions of the distribution system.

13. An agitating retort according to claim 12, wherein restricting or blocking of the processing fluid to specific portions of the distribution system depends on the rotational direction of the drum.

14. An agitating retort according to claim 13, wherein said flow controller is located within the fluid receiving annulus.

15. An agitating retort according to claim 1, further comprising a flow controller cooperative with said rotary coupling to selectively restrict or block flow of processing fluid to specific distribution lines of the processing fluid distribution system.

16. An agitating retort according to claim 15, wherein the specific lines of the processing fluid distribution system that are restricted or blocked depend upon the direction of rotation of the drum.

17. An agitating retort according to claim 1, further comprising a distribution manifold in fluid flow communication with the rotary coupling and in fluid flow communication with the fluid distribution system.

18. An agitating retort according to claim 17, wherein said distribution manifold is integrated into the rotary coupling.

19. An agitating retort according to claim 1, wherein the process fluid distribution system comprises a plurality of distribution lines disposed within the drum.

20. An agitating retort according to claim 1, wherein said rotary coupling comprising:
a substantially stationary section for receiving processing fluid from a supply source;
a processing fluid receiving section rotatably coupled with the drum assembly to receive processing fluid from the stationary section and directing the processing fluid to a processing fluid distribution system; and
a seal arrangement disposed between the stationary section and receiving section of the rotary coupling.

21. An agitating retort, comprising:
(a) a shell structure;
(b) a drum assembly rotatable within the shell structure, said drum assembly adapted to receive containers of products to be processed within the agitating retort;
(c) a process fluid distribution system positioned within the interior of the drum assembly to distribute processing fluid within the drum assembly;
(d) a rotary coupling disposed within the shell structure and exterior to the interior of the drum assembly, the rotary coupling further in fluid flow communication with the distribution system to direct processing fluid from the exterior of the drum assembly to the distribution system within the drum assembly during rotation of the drum assembly within the shell;
(e) wherein the drum assembly includes a hub sub-assembly coupled to one end portion of the drum assembly, said rotary coupling integrated into the hub sub-assembly;
(f) wherein said rotary coupling comprising portions defining a fluid receiving annulus in fluid flow communication with a source of processing fluid and in fluid flow communication with a processing fluid distribution system, said fluid receiving annulus comprises a groove formed in the hub sub-assembly, said groove being open in the radial direction relative to the hub sub-assembly; and
(g) wherein said rotary coupling further comprising:
a collar closely engaged over said groove;
a seal arrangement disposed between said collar and said groove, said seal permitting relative rotation between the collar and said groove while restricting passage of processing fluid between the collar and said groove; and
a processing fluid receiving inlet, located in said collar in communication with the groove.

22. An agitating retort according to claim 21, wherein the seal arrangement comprises a seal ring positioned between each side of said groove and said collar, and a seal positioned between each of said rings and the underside of said collar.

23. An agitating retort according to claim 22, further comprising a reaction mechanism for restricting the rotation of the collar with the rotation of the hub sub-assembly, said reaction mechanism coupled to the shell structure by a coupling system.

24. An agitating retort according to claim 23, wherein said coupling system comprising an arm extending from said collar, said arm coupled to said shell structure.

25. An agitating retort according to claim 21, further comprising a processing fluid supply line in communication with the collar inlet.

26. An agitating retort according to claim 25, further comprising a flexible coupling interposed between the processing fluid supply line and the collar inlet.

27. In an agitating retort having a shell structure and a drum assembly rotatable within the shell structure, the drum assembly configured to receive products to be processed within the agitating retort, an improved process fluid distribution system comprising:
a plurality of process fluid distribution outlets disposable within a drum assembly and thereby carryable by a drum assembly, said distribution outlets configured and positioned to apply process fluid over products receivable within a drum assembly; and a rotary coupling disposable within a shell structure and exterior to an interior of a drum assembly, said rotary coupling in fluid flow communication with the plurality of process fluid distribution system outlets to direct processing fluid from the exterior of a drum assembly to the plurality of distribution system outlets located within a drum assembly during rotation of a drum assembly, said rotary coupling comprising:

a substantially stationary section for receiving processing fluid from a supply source;

a rotatable fluid receiving section for receiving processing fluid from the stationary section, and directing the process fluid to the plurality of process fluid distribution outlets, said rotatable section rotatable relative to the stationary section; and a seal arrangement disposed between the stationary section and the rotatable section to control leakage of processing fluid from the rotary coupling.

28. An improvement according to claim 27, further comprising at least one process fluid distribution line for interconnecting the rotary coupling with the distribution system outlets disposable within a drum assembly.

29. An improvement according to claim 27, wherein the rotatable section of the rotary coupling comprising portions defining a fluid receiving annulus in fluid flow communication with a source of process fluid and in fluid flow communication with said process fluid distribution outlets.

30. An improvement according to claim 27, further comprising a hub assembly couplable to one end portion of a drum assembly, the rotary coupling integrated into said hub assembly.

31. An improvement according to claim 30, wherein the hub assembly is rotatable by a torque source applied to the hub assembly, thereby to rotate a drum assembly within a shell structure.

32. An improvement according to claim 27, further comprising a flow controller to restrict or block the flow of process fluid to selected of said plurality of process fluid distribution outlets.

33. For an agitating retort having a shell structure and an elongate drum assembly rotatable within the shell structure, a process fluid distribution system comprising:

a plurality of process fluid distribution lines disposable within the interior of the drum assembly and extendable longitudinally with the drum assembly, at least some of said plurality of distribution lines comprising a plurality of outlets capable of directing process fluid into the drum assembly; and a rotary coupling disposable exterior to the drum assembly in fluid flow communication with said plurality of distribution lines to direct process fluid to the distribution system lines locatable within the interior of the drum assembly during rotation of the drum assembly, said rotary coupling:

defining an axis of rotation extendable longitudinally of the length of the elongate drum assembly;

comprising portions defining a fluid receiving annulus in fluid flow communication with an inlet interconnectable with a source of process fluid, said inlet intersecting said annulus in a direction radially of the axis of rotation of the rotary coupling, said fluid receiving annulus in fluid flow communication with a plurality of passageways formed in the rotary coupling in a direction transversely to the annulus, said passageways in communication with the plurality of distribution lines; and further comprising a seal arrangement disposed between said inlet and said annulus.

34. The processing fluid distribution system according to claim 33, wherein said rotary coupling is locatable within the shell structure.

* * * * *